US008406760B2

(12) United States Patent
Tietz

(10) Patent No.: US 8,406,760 B2
(45) Date of Patent: Mar. 26, 2013

(54) METHOD AND ARRANGEMENT FOR USING CERTAIN INFORMATION ACQUIRED UPON REGISTRATION AT A BASE STATION ESPECIALLY FOR TRAFFIC FORECASTING

(75) Inventor: Benno Tietz, Köln (DE)

(73) Assignee: Vodafone Holding GmbH, Düsseldorf (DE)

( * ) Notice: Subject to any disclaimer, the term of this patent is extended or adjusted under 35 U.S.C. 154(b) by 480 days.

(21) Appl. No.: 12/762,308

(22) Filed: Apr. 17, 2010

(65) Prior Publication Data

US 2010/0267381 A1 Oct. 21, 2010

(30) Foreign Application Priority Data

Apr. 18, 2009 (DE) ........................ 10 2009 017 580

(51) Int. Cl.
*H04W 4/00* (2009.01)

(52) U.S. Cl. ............... 455/435.1; 455/456.1; 455/456.2; 455/456.3; 455/456.4; 455/456.5; 455/456.6; 455/39; 455/411; 455/446

(58) Field of Classification Search ............... 455/456.1, 455/456.2, 456.3, 456.4, 456.5, 456.6, 39, 455/411, 446
See application file for complete search history.

(56) References Cited

U.S. PATENT DOCUMENTS 5,222,140 A * 6/1993 Beller et al. .................... 380/30
2003/0069683 A1* 4/2003 Lapidot et al. ................ 701/117
2005/0027437 A1* 2/2005 Takenaga et al. ............. 701/117
2005/0208891 A1* 9/2005 Khare et al. ..................... 455/39
2006/0293836 A1* 12/2006 Mintz ........................... 701/117

FOREIGN PATENT DOCUMENTS

DE 103 34 140 2/2004

OTHER PUBLICATIONS

David Gundlegard et al.: Generating Road Traffic Information from Cellular Networks—New Possibilities in UMTS; 6th International Conference on ITS Telecommunications Proceedings; 2006; pp. 1128-1133.
D. Valerio: Road Traffic Information from Cellular Network Signaling; Technical Report; Ftw Forschungszentrum Telekommunikation Wien, Austria, Mar. 2009.
L Dölle: Einwegfunktionen Variationen und Beispiele, Humboldt Universität Berlin, Germany. 2002.

* cited by examiner

*Primary Examiner* — Kamran Afshar
*Assistant Examiner* — Shahriar Behnamian
(74) *Attorney, Agent, or Firm* — Gudrun E. Huckett

(57) ABSTRACT

In a method and an arrangement for using certain data acquired upon registration of a mobile communication device of a mobile subscriber of a cellular provider at a switching center, in particular for traffic forecasting, wherein the acquired data comprise at least a numerical identification associated with the person of the subscriber and time and location of registration at the switching center, the numerical identification is used at least partially as an argument of a true one-way function or pseudo one-way function for calculating a functional value. The functional value is associated with the acquired data, especially time and location of the registration. The acquired data including the functional value but without the numerical identification are transmitted to a unit using the data.

16 Claims, 2 Drawing Sheets

METHOD AND ARRANGEMENT FOR USING CERTAIN INFORMATION ACQUIRED UPON REGISTRATION AT A BASE STATION ESPECIALLY FOR TRAFFIC FORECASTING

BACKGROUND OF THE INVENTION

The invention in general relates to the operation of a cellular network (mobile telephony network) and in particular a method and an arrangement for using certain information acquired upon registration of a mobile communication device (communication equipment) at a base station (switching center) in particular for traffic forecasting. In this connection, the acquired data comprise at least a numerical identification associated with the person of the subscriber as well as time and location of registration at the base station (switching center).

In the field of the present invention, it is known to use certain information acquired upon registration of a mobile communication device at a switching center for traffic forecasting, in particular within the context of the so-called "floating car data" method. In this method, based on the acquired data, it is determined whether, and if so, at which speed and in which direction, a mobile communication device and thus also the subscriber of a cellular network operator (cellular provider) or the vehicle of the subscriber is moving in order to early on have feedback with regard to the future traffic situation, in particular with regard to the risk of a traffic jam, and to optionally deliver to the subscriber appropriate alerts and route recommendations.

Since providing such traffic prognoses is highly complex, it is usually performed by special companies that obtain from the cellular provider or an intermediate facility, a so-called aggregator, certain data. In order to correctly evaluate and interpret movements and brief stops, for example, at a rest area, it is important to be able to interrelate the location and time information, i.e., at which time a communication device used in such a prognosis method is located where, to further location and time information for the same communication device, at least for a certain period of time. It must therefore be ensured that information of the kind "X is at Y1 o'clock at location Z1" can be interrelated with further information of the kind "X is at Y2 o'clock at the location Z2". On the other hand, for reasons of privacy, it must be ensured that the information where X has been at certain times is not easily accessible and in particular is not available to the company that handles the task of traffic prognosis.

A solution for the afore described problem resulting from afore described contradictory requirements is not trivial, in particular because the employed standards for communication networks set narrows limits for the cellular providers in particular with regard to the use and the configuration of certain person-associated identifications, for example, the international mobile subscriber identity IMSI, the standards are necessary partially for the purpose of fulfilling certain legal requirements, partially for the basic purpose of enabling the interoperability of the various elements of a communication network.

Currently, only as a partial solution of the above discussed problem, the following approach is being used. Before transmitting the data to be utilized, the identification associated with the person of the subscriber is replaced with a different identification by means of a correlation table that is known to the cellular provider or an aggregator and by this different identification the subscriber is supposedly anonymous to the user but at the same time the user is still able to correlate the location and time information to further location and time information of the same subscriber. In such an approach the subscriber data are however not actually made anonymous but each subscriber is only assigned a pseudonym wherein by means of the correlation table it is easily and quickly possible to determine the actual subscriber.

SUMMARY OF THE INVENTION

It is an object of the present invention to provide a method and an arrangement of the aforementioned kind with which it is possible to assign an identifier to the data of a subscriber of a cellular provider which data are to be transmitted to a user in particular for traffic forecasting wherein the identifier enables to interrelate, at least within a certain period of time, the data to further data of the same subscriber of the cellular provider, but to ensure on the other hand that the user cannot determine based on the identifier or at least cannot easily determine, i.e., only with significant expenditure, the identity of the subscriber.

In accordance with the present invention, this is achieved in connection with a method for utilizing certain information acquired upon registration of a mobile communication device at a switching center (base station) in particular for providing traffic prognosis, wherein that acquired data comprise at least one numerical identification associated with the subscriber as well as time and location of registration at the switching center, by a method comprising the steps of:

employing the numerical identification at least partially as an argument of a true one-way function or pseudo one-way function for calculating a functional value;

associating the functional value with the acquired data to be used, especially the time and location of the registration; and transmitting the acquired data to be used including the functional value but without the numerical identification to a unit using the data.

In accordance with the present invention, this is achieved in connection with a corresponding arrangement for implementing such a method by an arrangement, comprising at least one mobile communication device that upon registration at a switching center is able to send an identification associated with the person of the subscriber and a mobile service switching center, wherein the arrangement according to the invention is characterized in that:

means are provided for calculating the functional value of a true one-way function or pseudo one-way function that employs the numerical identification at least partially as an argument of the one-way function;

means for associating the functional value with the data to be used, especially the time and location of the registration at the switching center; and means for transmitting the data to be used including the functional value but without the numerical identification to a unit using the data.

The defendant claims concern and teach further embodiments.

The invention is based on the idea that data that are transmitted to a user are to be provided with a unique identification (so-called identifier) that enables at least within a certain period of time to interrelate them to further data of the same subscriber of the cellular provider, wherein the functional value of a one-way function is used as an identifier so that the user, based on the identifier, is not able at all, or able only with significant expenditure, to determine the identity of the subscriber.

Further details and advantages of the invention result from the following exemplary and non-limiting description of different embodiments in connection with the drawing.

DESCRIPTION OF THE PREFERRED EMBODIMENTS

Figure 1:
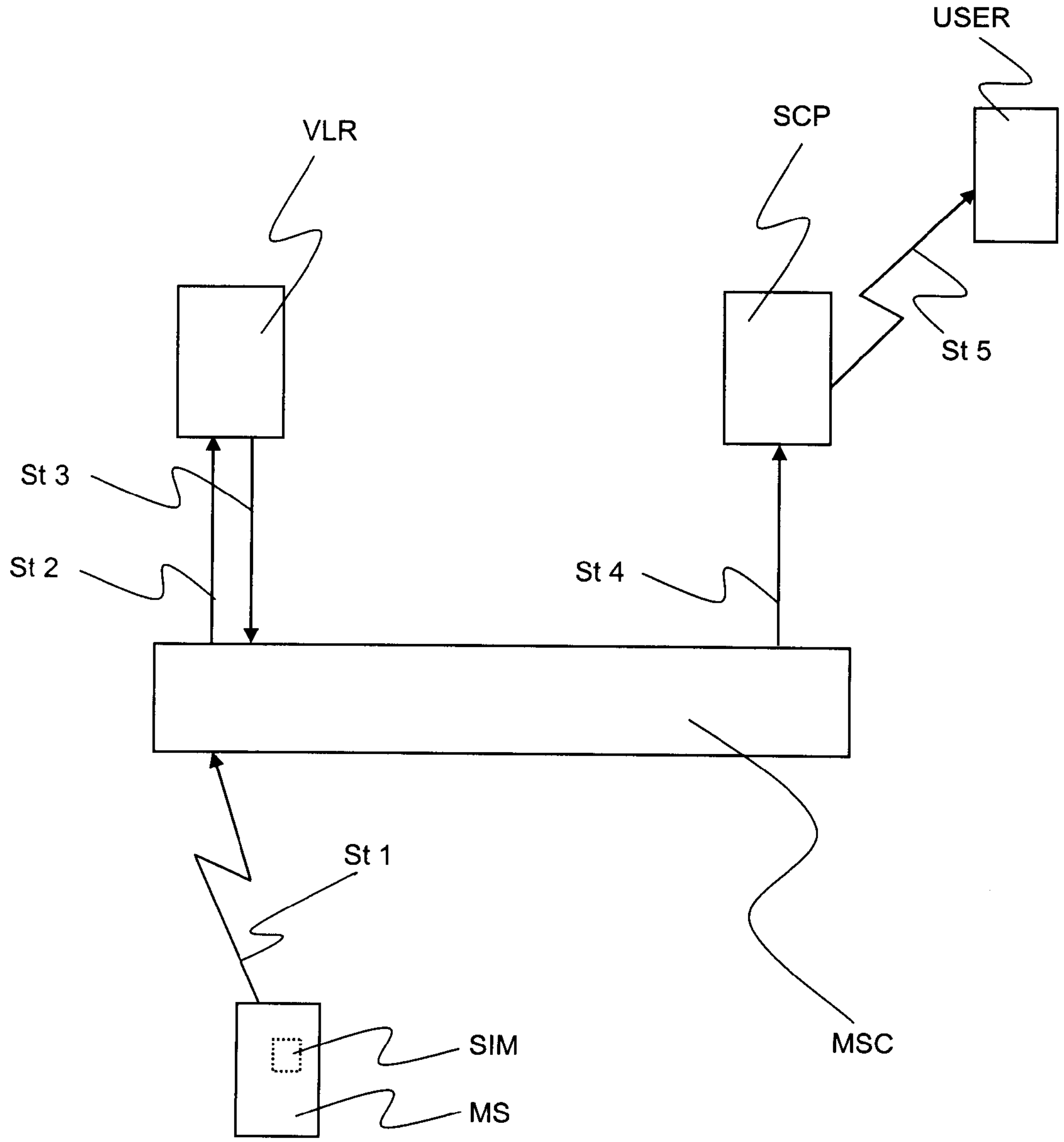
FIG. 1 shows schematically the basic architecture of a first embodiment of an arrangement according to the invention and illustrates also the sequence of individual method steps for this embodiment.

The arrangement according to the invention illustrated in FIG. 1 is provided for utilizing certain information that is acquired upon registration of a mobile communication device at a base station (switching center) in particular for providing traffic prognoses. The acquired data are comprised of at least one numerical identification associated with the person of the subscriber as well as the time and location of registration at the base station.

For the purpose of the following exemplary illustration, it is assumed that the mobile connection (cellular connection) with a cellular network is established according to GSM (Global System for Mobile Communication) standard, without this invention being limited to this standard. Therefore, in the following the conventional terms of GSM standard are used, for example, visitor location register VLR, wherein for a person skilled in the art it is however apparent that this must not necessarily be a conventional visitor location register but instead in principle this may be any database that, at the time of establishing a connection, is queried by the switching center whether the caller requesting a connection is even authorized to use the cellular network. The same holds true, mutatis mutandis, also for the so-called home location register.

The arrangement according to FIG. 1 comprises a mobile service switching center MSC that has correlated therewith a database referred to in this application as visitor location register VLR. When a mobile communication device registers with the mobile service switching center MSC, which usually is done automatically upon entering the receiving area of the switching center, the visitor location register requests in general from another database, the so-called home location register HLR, certain data that are required for establishing a connection to and from the mobile communication device and saves the data temporarily. The precise sequence of such a procedure is usually determined in the standard specifications of a cellular network, respectively. Of course, in special cases, VLR and HLR may be one and the same database.

The mobile communication device MS illustrated in FIG. 1 can be, for example, a cell phone, a personal digital assistant PDA with cell phone function or a fixedly installed car phone, and is owned by a subscriber of a cellular provider. In the communication device, as indicated by dashed lines, a subscriber identification module in the form of a SIM card (SIM) is arranged wherein the SIM card is made available to the subscriber by the cellular provider.

In the SIM card at least a subscriber identification number, the so-called IMSI (international mobile subscriber identity), is saved. In the aforementioned home location register each subscriber identification number has associated therewith a phone number, the so-called MSISDN—mobile subscriber ISDN number (ISDN=integrated services digital network). Each phone number has associated therewith a certain subscriber profile, known in the art and therefore not described in detail here, wherein the subscriber profile of the subscriber in question contains the information that certain data may be transmitted to a unit USER, generally a complex computing center (in the following called user), that uses the data, for example for providing traffic prognosis.

In the first method that is indicated by arrow St 1 the mobile communication device MS registers at a known so-called base station subsystem (BSS), not illustrated, with the mobile service switching center MSC. When doing so, the international mobile subscriber identity IMSI is transmitted to the mobile service switching center.

In step St 2 a portion of the transmitted IMSI, i.e., the mobile subscriber identification number—MSIN, is authenticated in the visitor location register. When the visitor location register, possibly after comparison with the home location register, finds an appropriate entry related to the MSIN, it will relay to the mobile service switching center in step St 3 which services the subscribers has authorized and which services he has subscribed to so that the mobile service switching center can start the appropriate services. If the subscriber has authorized the cellular provider to transmit certain data to a unit USER that, for example, provides traffic prognosis, this taks can be handled by a so-called intelligent network in the same way as a service or can trigger a certain service.

In the present case, the mobile service switching center MSC in the step St 4 will start a dialogue with a service control point SCP and transfer a data packet that comprises at least a numerical identification related to the person of the subscriber as well as the time and location of registration at the switching center. In this connection, for example, the subscriber identification number or an identification number specific to the telecommunication device, the so-called IMEI—international mobile equipment identity, can be used as a person-associated identification.

In this example, the service control point SCP then calculates a functional value of a true or pseudo one-way function wherein the numerical identification at least partially is used as an argument of the one-way function. In this context, the term true one-way function is to be understood as a function f(x) having the following properties:

there exists an efficient method for calculating y=f(x)

there is no efficient method for calculating $x=f^1(y)$ (wherein $f^1$ is the inverse function of f).

To this day, it has not been proven that true one-way functions actually exist. However, a person skilled in the art knows a variety of functions—in the context of this application they are referred to as “pseudo” one-way functions—that fulfill the required properties at least for large arguments so sufficiently that the above described desired substantial anonymization is possible. Advantageously, the employed one-way function is a so-called strong, at least however a so-called weak, one-way function wherein a strong one-way function by definition is easy to calculate and hard to invert, while a weak one-way function is easy to calculate and less difficult to invert. For a more precise definition, int his context reference is being had in an exemplary fashion to the following publication: “Einwegfunktionen Variationen und Beispiele”; by Lukas Dölle; Humboldt Universität Berlin; Lehrstuhl für Informatik; Berlin, Germany, 2002.

In an specially preferred embodiment the one-way function is a trap door one-way function.

Of course, this calculation of the functional value must not be carried out by the cellular provider at service control point or at another suitable location, for example, at the mobile service switching center itself, but can also be realized by means of an aggregator (see FIG. 2 in this context) to which the data to be used are transmitted by the cellular provider, including the numerical identification associated with the person of the subscriber.

Once the functional value has been calculated, the service control point in the illustrated example then transmits in step St 5 the acquired data to be used, including the functional value that has been associated as an identifier with the data to be used, in particular the time and location of registration at the mobile service switching center, but without the numerical identification, to the un it USER where the data are used.

Figure 2:
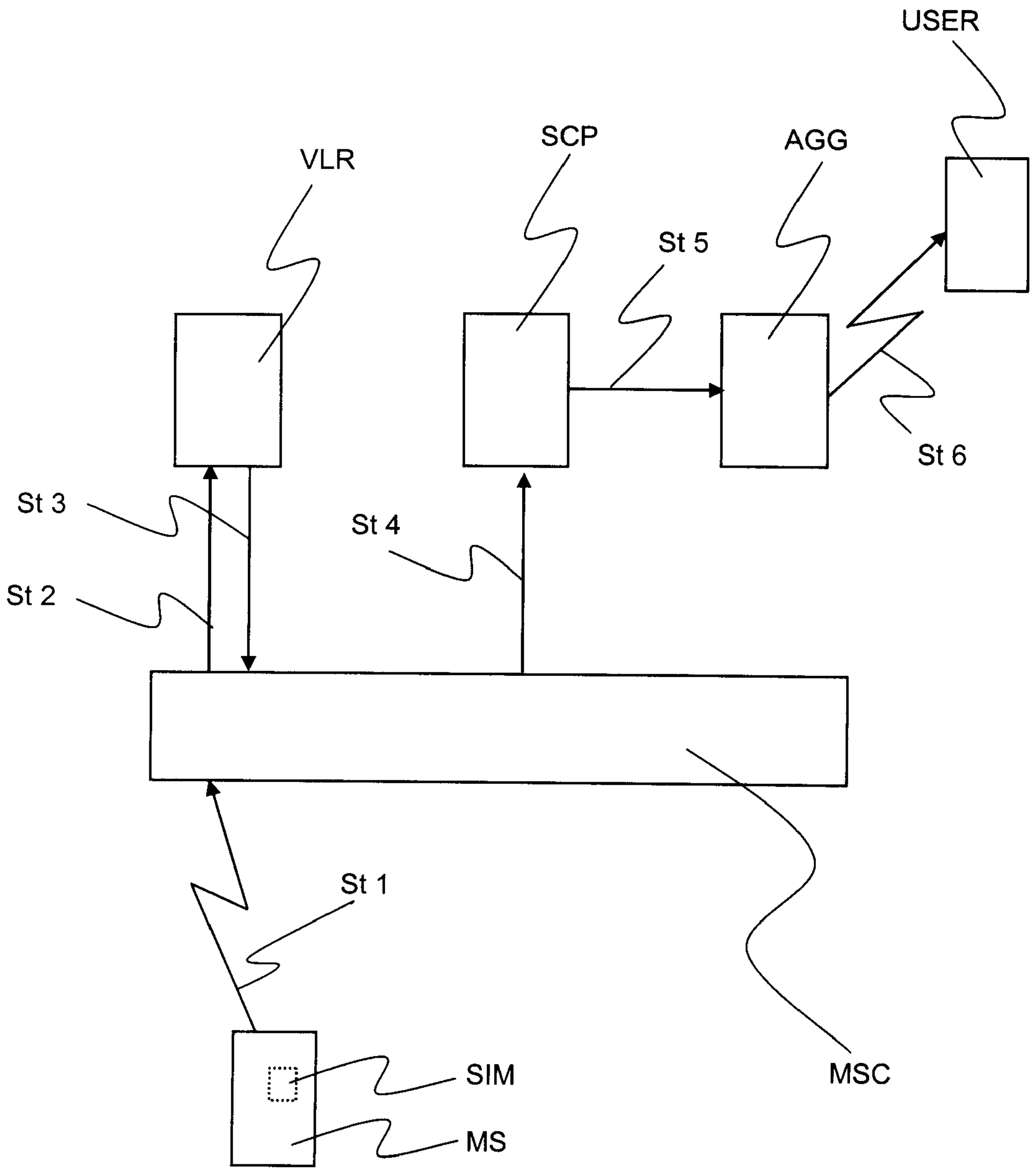
FIG. 2 shows schematically the basic architecture of a second embodiment of an arrangement according to the invention and illustrates also the sequence of the individual method steps for this embodiment.

In the second embodiment that is purely schematically illustrated in FIG. 2, in addition to the elements disclosed in connection with FIG. 1, an aggregator AGG is provided in which in this embodiment the tasks of calculating the functional value and transmitting data to the unit USER are provided. Advantageously, several aggregators AGG can also be provided wherein then those aggregators that transmit data to the same unit USER must calculate the functional value at least within certain time windows in the same way in order to generate the same identifier and to ensure in this way that the unit USER can identify data as originating from one and the same mobile subscriber (without, of course, obtaining any indication with regard to the identity of the mobile subscriber). As will be explained in more detail in the following, it is advantageous to change the employed one-way function and/or optionally additionally employed codes at regular or irregular intervals, for example, once a day. Data that are transmitted after such a change, of course, can no longer be correlated by the unit USER to data that are associated with the same subscriber; however in particular for traffic prognosis this is not a problem when the change is realized at times of minimal traffic.

When the mobile switching center MSC in the method step St 4 has transmitted to the service control point SCP the afore described data packet, the service control point SCP transfers it in step St 5 to the aggregator AGG; of course, it is also conceivable that the switching center communicates directly with the aggregator.

Since, as has been mentioned above, traffic forecasting is a very complex task, it may be provided advantageously that the service control point SCP or the aggregator AGG evaluates the data to be used before being transmitted farther to the unit USER with regard to whether, and if so, at which speed and/or in which direction, the mobile subscriber is moving. For avoiding unnecessary transmission of information, it may then be further provided advantageously that the data to be used are transmitted to the unit USER only when upon evaluation it has been determined that the mobile subscriber is moving or that the previously determined movement has stopped.

In the context of the invention numerous modifications and embodiments are possible that relate, for example, to the task of increasing the safety with respect to inverting the one-way function. Since for known functions with one-way properties the inversion is all the more difficult the greater the argument, in an advantageous further embodiment it can be provided that additional digits are added to the numerical identification in accordance with certain criteria and that the thus supplemented identifier is used as an argument for calculating the functional value. Also, it can be provided that for the calculation step an additional code is used.

Advantageously, it can be provided that the one-way function and/or an additional code employed together with the one-way function and/or the digits that are added to the identifier in accordance with certain criteria are changed in regular or irregular intervals.

Also, it should be underscored that in addition to the illustrated service control point SCP of course further service control points, not illustrated, may be provided that are addressed by the mobile service switching center MSC before or after the service control point SCP in order to perform further services.

The invention enables finally also a novel business concept according to which it is possible for a cellular provider to offer to a mobile subscriber an additional service with regard to traffic guidance and traffic jam avoidance.

The specification incorporates by reference the entire disclosure of German priority document 102009017580.6 having a filing date of Apr. 18, 2009.

While specific embodiments of the invention have been shown and described in detail to illustrate the inventive principles, it will be understood that the invention may be embodied otherwise without departing from such principles.

What is claimed is:

1. A method for using certain data acquired upon registration of a mobile communication device of a mobile subscriber of a cellular provider at a mobile service switching center, in particular for traffic forecasting, wherein the acquired data comprise at least a numerical identification associated with a person of the mobile subscriber and time and location of registration at the mobile service switching center, the method comprising the steps of:

employing said numerical identification at least partially as an argument of a true one-way function or pseudo one-way function for calculating a functional value and using an additional code with the one-way function in the step of calculating the functional value;

associating the functional value with the acquired data, especially the time and location of the registration; and transmitting the acquired data including the functional value but without said numerical identification to a unit using the data adding to said numerical identification additional digits determined by certain criteria, wherein said numerical identification with the additional digits is used as an argument in the step of calculating the functional value;

wherein the one-way function or the additional code or the additional digits are changed in irregular intervals.

2. The method according to claim 1, wherein the mobile subscriber has a subscriber identification module that is used in the mobile communication device and that has assigned at least one international mobile subscriber identity, wherein the international mobile subscriber identity is used as said numerical identification.

3. The method according to claim 1, wherein the mobile communication device has a device-specific identification number that is used as said numerical identification.

4. The method according to claim 1, wherein the step of calculating the functional value is carried out by the cellular provider.

5. The method according to claim 1, wherein the step of calculating the functional value is carried by an aggregator to which the cellular provider transmits the acquired data including said numerical identification.

6. The method according to claim 5, wherein the step of calculating the functional value is carried out at several aggregators wherein all aggregators calculate the functional value in the same manner.

7. The method according to claim 1, wherein the acquired data, before being transmitted, are evaluated with respect to whether, and if so, at which speed and/or in which direction, the mobile subscriber is moving.

8. The method according to claim 7, wherein the acquired data are transmitted only when upon evaluation it has been determined that the mobile subscriber is moving or that the previously determined movement of the mobile subscriber has stopped.

9. The method according to claim 1, wherein the one-way function is a strong one-way function.

10. The method according to claim 1, wherein the one-way function is a weak one-way function.

11. The method according to claim 1, wherein the one-way function is a trap door one-way function.

12. An arrangement for using certain data acquired upon registration of a mobile communication device of a mobile subscriber of a cellular provider at a mobile service switching center, in particular for traffic forecasting, wherein the acquired data comprise at least a numerical identification associated with a person of the subscriber and time and location of registration at the mobile service switching center, said arrangement comprising:

a mobile service switching center;

at least one mobile communication device that upon registration at the mobile service switching center is able to send a numerical identification associated with the person of the mobile subscriber;

means for calculating a functional value of a true one-way function or pseudo one-way function, wherein said means for calculating that employs said numerical identification at least partially as an argument of the true or pseudo one-way function and adds to said numerical identification additional digits determined by certain criteria wherein said numerical identification with the additional digits is used as an argument in the step of calculating the functional value, and uses an additional code with the one-way function for calculating the functional value;

means for associating the functional value with acquired data associated with the at least one mobile communication device upon registration at the mobile service switching center, especially time and location of the registration at the mobile service switching center; and means for transmitting the acquired data, including the functional value but without the numerical identification to a unit using the data, wherein the one-way function or the additional code or the additional digits are changed in irregular intervals.

13. The arrangement according to claim 12, wherein the at least one mobile communication device comprises a subscriber identification module that has assigned thereto at least one subscriber identification number, wherein the means for calculating the functional value uses the subscriber identification number as said numerical identification.

14. The arrangement according to claim 12, wherein the at least one mobile communication device has a device-specific identification number, wherein the means for calculating the functional value uses the device-specific identification number as said numerical identification.

15. The arrangement according to claim 12, wherein the means for calculating the functional value is an aggregator to which the acquired data including said numerical identification is transmitted by the cellular provider.

16. The arrangement according to claim 12, further comprising means for evaluating the acquired data before further transmission to the user, wherein an evaluation is carried out whether, and if so, at which speed and/or in which direction, the mobile subscriber is moving.

* * * * *